(12) United States Patent
Young et al.

(10) Patent No.: US 12,269,392 B1
(45) Date of Patent: Apr. 8, 2025

(54) ACCENT LIGHTING SYSTEMS FOR CUPHOLDERS IN VEHICLES

(71) Applicant: Nissan North America, Inc., Franklin, TN (US)

(72) Inventors: Steven Young, Ypsilanti, MI (US); Nelson Phan, Rochester Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 12 days.

(21) Appl. No.: 18/375,128

(22) Filed: Sep. 29, 2023

(51) Int. Cl.
*B60Q 3/225* (2017.01)
*B60K 35/00* (2024.01)
*B60K 35/22* (2024.01)
*B60Q 3/80* (2017.01)

(52) U.S. Cl.
CPC ............ *B60Q 3/229* (2022.05); *B60Q 3/80* (2017.02); *B60K 35/00* (2013.01); *B60K 35/223* (2024.01); *B60K 2360/47* (2024.01)

(58) Field of Classification Search
CPC .......... B60Q 3/229; B60Q 3/80; B60K 35/00
See application file for complete search history.

(56) References Cited

U.S. PATENT DOCUMENTS

| 8,534,862 | B2 | 9/2013 | Simon et al. |
| 10,173,571 | B2 | 1/2019 | Park et al. |
| 10,386,566 | B2 | 8/2019 | Jeno et al. |
| 11,752,934 | B1 | 9/2023 | Young et al. |
| 12,024,088 | B2* | 7/2024 | Adams ................ H02J 50/005 |
| 2015/0042223 | A1 | 2/2015 | Harrington |
| 2015/0136932 | A1 | 5/2015 | Salter et al. |
| 2016/0344221 | A1 | 11/2016 | Kramer et al. |
| 2020/0036228 | A1 | 1/2020 | Simpson et al. |
| 2021/0094455 | A1 | 4/2021 | Cadena et al. |
| 2024/0140308 | A1* | 5/2024 | Young ................ B60Q 3/80 |

FOREIGN PATENT DOCUMENTS

| CN | 104930409 A | 9/2015 |
| CN | 105263752 B | 10/2018 |

* cited by examiner

*Primary Examiner* — Thomas M Sember
(74) *Attorney, Agent, or Firm* — Young Basile Hanlon & MacFarlane, P.C.

(57) ABSTRACT

An accent lighting system for a vehicle that includes a light module, which may be flexible or rigid in construction, and a transmitter. The light module includes a first inductive member, and the transmitter includes a second inductive member that is configured for electromagnetic communication with the first inductive member so as to create current in the first inductive member and thereby power the light module. The light module may be reconfigurable between unfolded and folded configurations and may emit light via a light-permeable diffuser that extends along an outer perimeter of the housing or via a display panel (e.g., an OLED screen).

20 Claims, 6 Drawing Sheets

ACCENT LIGHTING SYSTEMS FOR CUPHOLDERS IN VEHICLES

BACKGROUND

Accent lighting is commonly used in vehicles to change and/or improve the overall aesthetic appearance of the passenger compartment. Known accent lighting systems, however, typically require a wired connection between the light source and a power source in the vehicle, which complicates installation in that it requires the formation of one or more penetrations (e.g., openings, holes, etc.) to route the necessary wiring, are often cumbersome to insert and remove, and often fail to achieve a desirable fit and finish. In the context of a lighted cupholder in particular, such penetrations are problematic in that they create pathways for fluid to enter inner, generally inaccessible areas of the vehicle, such as the space beneath the console, in the event of a spill.

The present disclosure addresses these concerns by providing an accent lighting system that is powered via electromagnetic induction, thereby eliminating (obviating) the need to create penetrations at the installation site in the vehicle, and which improves insertion and removal in addition to the overall aesthetic appearance of the vehicle (e.g., the cupholder).

SUMMARY

In one aspect of the present disclosure, an accent lighting system for a vehicle is disclosed. The accent lighting system includes a light module that is configured for insertion into a cupholder in a console of the vehicle and a transmitter that is located externally of the cupholder. The light module includes: a housing; a diffuser that extends along an outer perimeter of the housing and which includes one or more light-permeable materials so as to allow light to pass therethrough; a first inductive member that is located within the housing; and a cover that is supported by the housing, wherein the housing, the cover, and the diffuser are flexible in construction so as to allow the light module to conform to the cupholder. The transmitter includes a second inductive member that is configured for electromagnetic communication with the first inductive member such that the second inductive member wirelessly delivers power to the first inductive member, thereby obviating any need for penetrations in the cupholder to establish electrical communication between the transmitter and the light module so as to inhibit fluid leakage from the cupholder.

In certain embodiments, the housing and the cover may each include a thermoplastic elastomer.

In certain embodiments, the accent lighting system may further include a printed circuit board assembly (PCBA) that is located within the housing.

In certain embodiments, the PCBA may be flexible in construction.

In certain embodiments, the accent lighting system may further include an adhesive member that is positioned between the housing and the PCBA.

In certain embodiments, the PCBA may include at least one light source and may be in electrical communication with the first inductive member such that the first inductive member delivers power to the at least one light source.

In certain embodiments, the at least one light source may be connected (secured) to the PCBA.

In certain embodiments, the at least one light source may be spaced radially inward from the diffuser to inhibit visual perception of the at least one light source.

In another aspect of the present disclosure, an accent lighting system for a vehicle is disclosed. The accent lighting system includes a light module that is configured for insertion into a cupholder in a console of the vehicle and a transmitter that is located externally of the cupholder and which is configured for electromagnetic communication with the light module to thereby power the light module. The light module defines a longitudinal axis and includes a first segment and a second segment that is connected (secured) to the first segment such that the light module is reconfigurable between an unfolded configuration, in which the first segment and the second segment are positioned in adjacent relation along the longitudinal axis, and a folded configuration, in which the first segment and the second segment are superimposed.

In certain embodiments, the light module may further include a locking mechanism that is configured to secure the light module in the unfolded configuration.

In certain embodiments, the locking mechanism may include first and second locking members that are configured for mechanical engagement.

In certain embodiments, the locking mechanism may include first and second locking members that are configured for magnetic engagement.

In certain embodiments, the light module may further include: a housing; a diffuser that extends along an outer perimeter of the housing and which is configured to distribute light emitted by the light module; a PCBA that is located within the housing; and a cover that is supported by the housing.

In certain embodiments, the housing, the diffuser, the PCBA, and the cover may each include a rigid material.

In certain embodiments, the housing may include a first hinge member, the diffuser may include a second hinge member, and the cover may include a third hinge member.

In certain embodiments, the PCBA may include first and second PCBA portions and an electrical connector that electrically connects the first and second PCBA portions such that data and/or power are communicable therebetween.

In certain embodiments, the light module may be configured such that the first hinge member, the second hinge member, the third hinge member, and the electrical connector are generally aligned along the longitudinal axis.

In certain embodiments, the light module may be configured such that the first hinge member, the second hinge member, the third hinge member, and the electrical connector are generally aligned with a midline of the light module that extends in generally orthogonal relation to the longitudinal axis.

In another aspect of the present disclosure, an accent lighting system for a vehicle is disclosed. The accent lighting system includes a light module that is configured for insertion into a cupholder in a console of the vehicle and a transmitter that is located externally of the cupholder. The light module is reconfigurable between an unfolded configuration and a folded configuration and includes: a housing; a PCBA that is located within the housing; and a cover that overlies the PCBA and which includes a display panel, wherein the transmitter is configured for electromagnetic communication with the light module to thereby power the display panel.

In certain embodiments, the display panel may be flexible in construction.

In certain embodiments, the display panel may include an OLED screen.

In certain embodiments, the PCBA may be in electrical communication with the display panel.

In certain embodiments, the PCBA may support a first inductive member, and the transmitter may include a second inductive member that is configured for electromagnetic communication with the first inductive member to thereby deliver power to the display panel via the PCBA.

BRIEF DESCRIPTION OF THE DRAWINGS

According to common practice, the various features of the drawings may not be to scale and may be arbitrarily expanded or reduced for clarity.

DETAILED DESCRIPTION

The present disclosure describes an accent lighting system for a vehicle that is powered via electromagnetic induction, which eliminates (obviates) the need to create any penetrations (e.g., openings, holes, etc.) during installation so as not to form any pathways at the installation site (e.g., a cupholder in a console of the vehicle) that might otherwise allow to fluid to enter generally inaccessible areas of the vehicle (e.g., in the event of a spill). More specifically, the accent lighting system described herein includes a light module and a transmitter with corresponding inductive members (e.g., coils) that create an induced magnetic field upon receiving current from a power source in the vehicle so as to wirelessly power the light module.

In one embodiment of the disclosure, the light module is flexible in construction, which facilitates insertion and removal of the light module by allowing for resilient deformation (e.g., bending, deflection) thereof, conformity with the installation site, and sound dampening.

In another embodiment of the disclosure, the light module is reconfigurable between unfolded and folded configurations in order to reduce the overall dimensions of the light module and facilitate storage thereof (i.e., when removed from the installation site).

In various embodiments of the disclosure, it is envisioned that light may be generated (emitted) by (one or more) at least one light source (e.g., a plurality of light sources) that is located internally within the light module. Alternatively, it is envisioned that the light module may include a display panel (e.g., an OLED screen) that is configured to display moving patterns, images, videos, etc., in addition to emitting light.

While generally described in the context of cupholders that are located in the center console of the vehicle, it should be appreciated that the principles, components, and methods described herein are applicable to a wide variety of installation sites.

Figure 1:
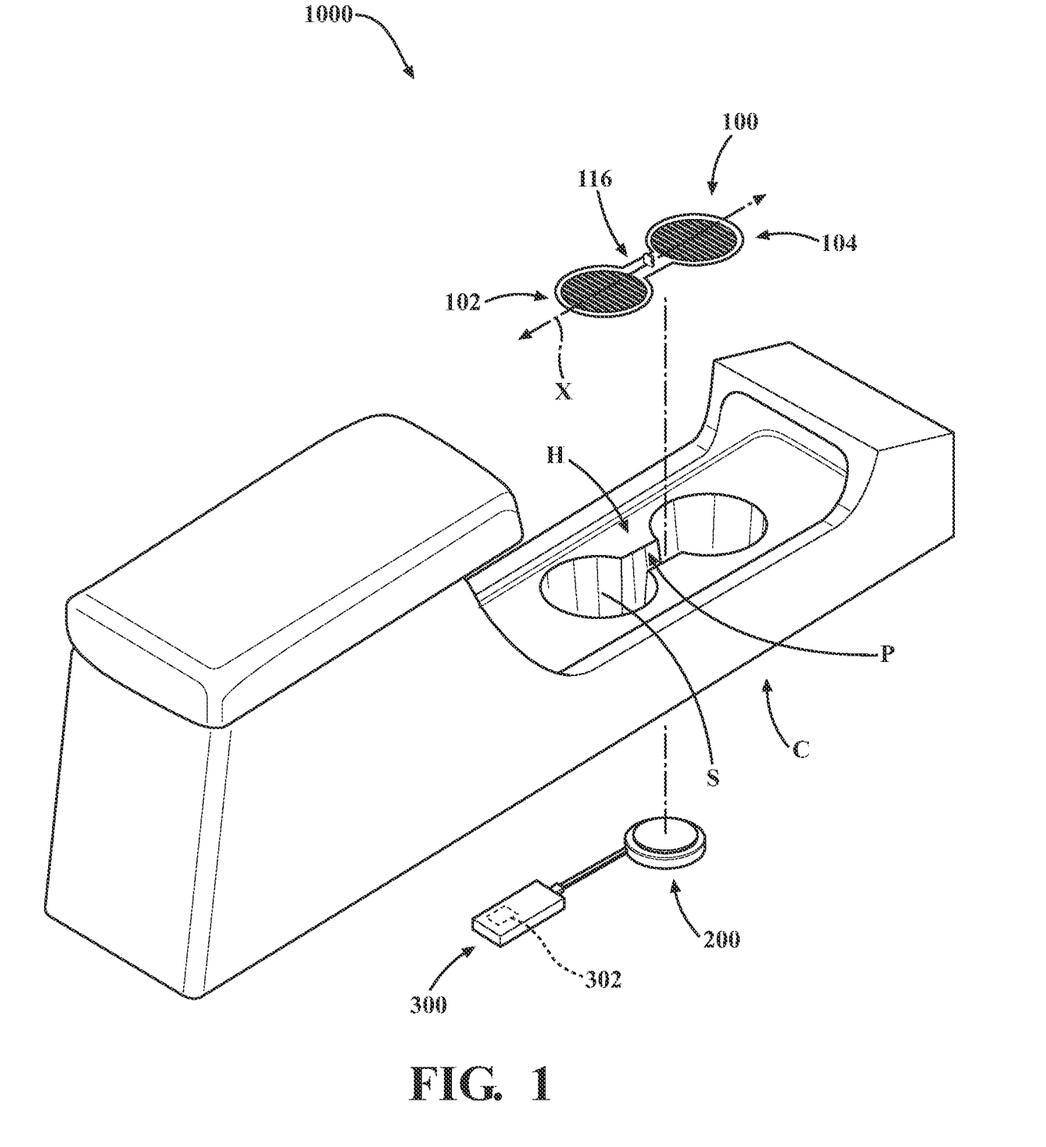
FIG. 1 is a top, perspective view of an accent lighting system for a vehicle according to the principles of the present disclosure, which is shown in connection with an installation site (e.g., a cupholder in a console of the vehicle) and includes: a light module; a transmitter; and a control module.

With reference to FIG. 1, an accent lighting system 1000 for a vehicle is disclosed that includes: a light module (receiver) 100, which defines a central longitudinal axis X and includes opposite ends 102, 104; a transmitter 200; and a control module 300. Although generally illustrated and described in the context of a passenger vehicle, it should be appreciated that the accent lighting system 1000 described herein may be configured for use with a wide variety of vehicles including trucks, SUVs, vans, buses, boats, airplanes, trains, etc.

In the particular embodiment illustrated, the accent lighting system 1000 is associated with a (center) console C of the vehicle and, more specifically, is configured to illuminate one or more cupholders H in the console C. It should be appreciated, however, that the accent lighting system 1000 may be configured for use in a wide variety of locations within the vehicle including, for example, a glove box or other such storage compartment, one or more seats in passenger compartment, one or more visors, door trim, etc.

Figure 2:
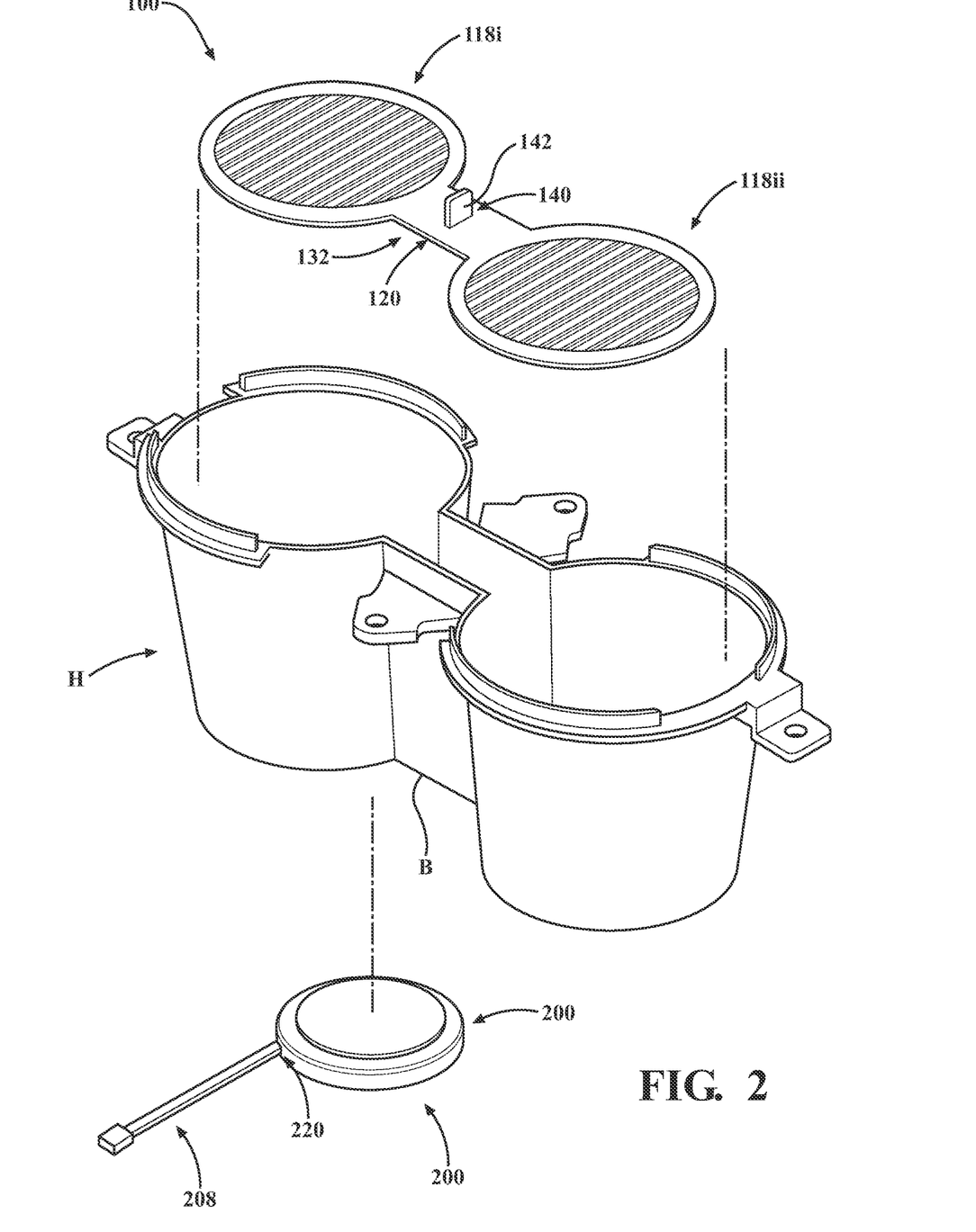
FIG. 2 is a top, perspective view of the light module and the transmitter shown with the cupholder.
Figure 3:
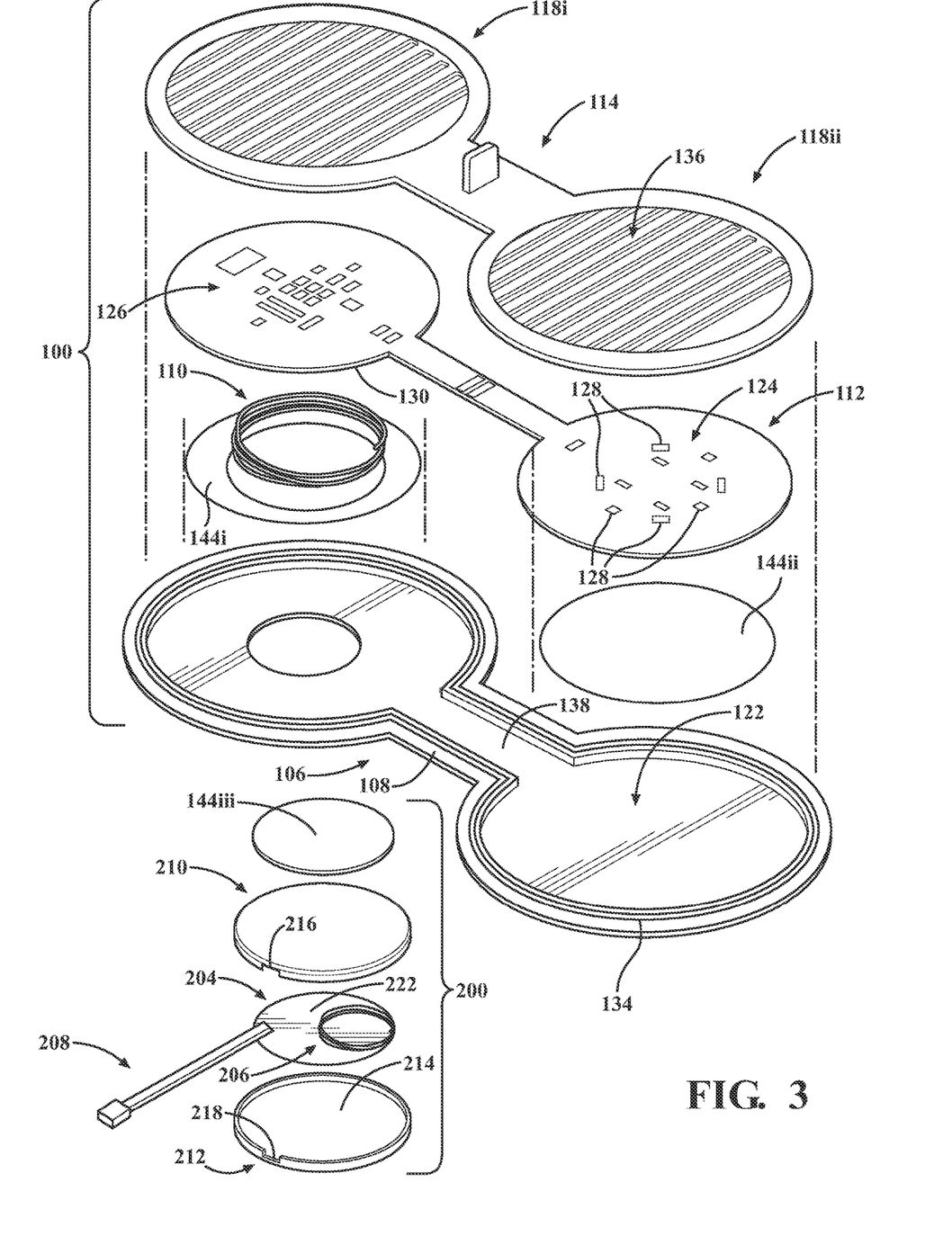
FIG. 3 is a top, perspective view of the light module and the transmitter shown with parts separated.

Referring now to FIGS. 2 and 3 as well, the light module 100 includes: a (first) housing 106; a diffuser (lens) 108; a (first) inductive member (coil) 110; a (first) PCBA 112; and a cover 114. The light module 100 is configured for removable insertion into the cupholder(s) H (FIGS. 1, 2) and defines an outer profile (contour, configuration) 116 (FIG. 1) that corresponds to (i.e., substantially approximates, matches, mirrors) an inner profile (contour, configuration) P defined by the cupholder(s) H. In the particular embodiment illustrated, the light module 100 and the cupholder(s) H each include a modified lemniscate configuration. More specifically, the light module 100 includes (first and second) nodes 118*i*, 118*ii* having generally circular configuration that are connected (secured) by a generally linear bridge portion 120. It should be appreciated, however, the particular configuration of the light module 100 may be altered in various embodiments without departing from the scope of the present disclosure (e.g., depending upon the particular configuration of the cupholder(s) H). For example, embodiments of the light module 100 including nodes 118 with non-circular configurations are envisioned herein. Additionally, depending upon the particular configuration of the cupholder(s) H, it is envisioned that the number of nodes 118 may be increased or decreased. As such, embodiments of the light module 100 including a single node 118 (and devoid of the bridge portion 120) are also envisioned herein, as are embodiments including three or more nodes 118, and would not be beyond the scope of the present disclosure.

The corresponding outer profiles (contours, configurations) 116, P respectively defined by the light module 100 and the cupholder(s) H allows the light module 100 to be received by and retained within the cupholder(s) H without any fixed connection therebetween. Embodiments of the disclosure in which the light module 100 may be (mechanically) connected (secured) to the cupholder(s) H, however, are envisioned herein and would not be beyond the scope of the present disclosure. For example, it is envisioned that the light module 100 and the cupholder(s) H may be connected (secured) together in an interference (pressure, snap) fit arrangement, via one or more mechanical fasteners, via an adhesive, etc.

The housing 106 receives (supports) the cover 114 and defines an internal chamber 122 (FIG. 3), which is configured to receive the inductive member 110 and the PCBA 112. More specifically, the housing 106 supports the cover 114 such that the diffuser 108 is positioned radially outward thereof and such that the cover 114 overlies (conceals) the PCBA 112 and the inductive member 110.

In certain embodiments, it is envisioned that the light module 100 may be configured for engagement (contact) with the cupholder(s) H so as to inhibit (if not entirely prevent) unintended movement of the light module 100 within the cupholder(s) H and thereby reduce (if not entirely eliminate) rattle, etc. For example, it is envisioned that the housing 106 may include one or more location members (e.g., detents) that are configured for engagement (contact) with an inner surface S (FIG. 1) of the cupholder(s) H, thereby eliminating the need for any fixed (e.g., mechanical, adhesive) connection between the housing 106 and the cupholder(s) H, which allows for repeated insertion and removal of the light module 100 (e.g., to facilitate repair, maintenance, or replacement thereof, cleaning of the cupholder(s) H, etc.). The absence of any fixed connection between the light module 100 and the cupholder(s) H eliminates (obviates) any need to create or form any penetrations at the installation site (e.g., drill holes or otherwise form openings in the cupholder(s) H), which not only simplifies installation, but prevents the creation of any pathways that might otherwise allow fluid to enter generally inaccessible areas of the vehicle (e.g., the spaces beneath and/or internal to the console C) and, thus, inhibits (if not entirely prevents) any fluid leakage from the cupholder(s) H (e.g., in the event of a spill).

The PCBA 112 (FIG. 3) is located between the housing 106 and the cover 114 and supports a plurality of electrical components that facilitate operation of the light module 100 in the manner described herein including, for example, (one or more) at least one (e.g., a plurality of) light sources 124 and a microprocessor 126. The PCBA 112 is in electrical communication with the inductive member 110 such that current generated in the inductive member 110 is transmitted to the light source(s) 124 via the PCBA 112.

The light source(s) 124 may be configured and oriented to emit (direct) light in any direction or combination of directions. For example, it is envisioned that the light source(s) 124 may be configured to direct light radially (i.e., towards the diffuser 108) and/or vertically (i.e., towards the cover 114).

In the particular embodiment of the accent lighting system 1000 illustrated, the light source(s) 124 are configured to emit multi-colored light. Embodiments in which the light source(s) 124 may include a monochromatic configuration, however, are also envisioned herein and would not be beyond the scope of the present disclosure.

As seen in FIG. 3, the light source(s) 124 are connected (secured) to (or otherwise supported by) the PCBA 112 such that they are spaced radially inward from the diffuser 108. Spacing the light source(s) 124 radially inward of the diffuser 108 inhibits (if not entirely prevents) visual perception of the light source(s) 124 through the diffuser 108 and, thus, the appearance of hotspots or other such areas of increased brightness.

In the particular embodiment illustrated, the light source(s) 124 include an array of LEDs 128 that are supported by the PCBA 112 such that the light source(s) 124 are located within the node 118ii (FIGS. 2, 3). It should be appreciated, however, that the specific configuration (arrangement) of the light source(s) 124 may be altered in various embodiments without departing from the scope of the present disclosure (e.g., based upon the desired aesthetic appearance of the cupholder(s) H or other such installation site, electrical and/or power capabilities, etc.). For example, embodiments in which the light source(s) 124 are supported by the PCBA 112 such that the light source(s) 124 are located within the node 118i, either in addition to or instead of the node 118ii, are also envisioned herein and would not be beyond the scope of the present disclosure.

In the particular embodiment illustrated, the inductive member 110 is connected (secured) to (or otherwise supported by) the PCBA 112, which facilitates the delivery of power from the inductive member 110 to the PCBA 112. More specifically, the inductive member 110 is connected (secured) to a lower (bottom) surface 130 of the PCBA 112 such that the PCBA 112 overlies the inductive member 110, which inhibits (if not entirely prevents) unintended relative movement between the various components of the light module 100 (e.g., the housing 106, the inductive member 110, the PCBA 112, etc.), thereby protecting the inductive member 110 from damage during installation, removal, and/or use of the light module 100.

The diffuser 108 extends along (about) an (outer) periphery 132 of the light module 100 (i.e., an outer perimeter 134 of the housing 106) and (partially) defines the outer profile 116 of the light module 100. The diffuser 108 is configured to collect and disperse (distribute) light generated (emitted) by the light module 100 (i.e., by the light source(s) 124) in a plurality of directions and may include (i.e., may be formed partially or entirely from) any material or combination of materials suitable for that intended purpose. More specifically, in the particular embodiment illustrated, the diffuser 108 includes one or more light-permeable (e.g., translucent, semi-transparent, or transparent) materials, which allows light generated (emitted) by the light source(s) 124 to pass therethrough and emanate from the light module 100 to thereby illuminate the cupholder(s) H, the console C, and the interior of the vehicle. The dispersion (distribution, spreading) of light facilitated by the diffuser 108 not only allows for a reduction in the number of light source(s) 124, but increases uniformity in the overall (aesthetic) appearance of the lighting assembly 1000 by further reducing (if not entirely eliminating) the formation and perception of hotspots or other such areas of increased brightness.

In the particular embodiment illustrated, the diffuser 108 is configured as a component of the housing 106 and is formed integrally (i.e., unitarily, monolithically) therewith from a single piece of material. Embodiments in which the housing 106 and the diffuser 108 may be configured as separate, discrete components of the light module 100 are also envisioned herein, however, as descried in further detail below.

The cover 114 is configured as a mat 136 that conceals and protects the internal components of the light module 100 (e.g., the inductive member 110, the PCBA 112, the light source(s) 124, etc.) and is configured to support one or more containers (not shown) upon insertion into the cupholder(s) H. The cover 114 may include any suitable material or combination of materials such as, for example, one or more plastic materials (e.g., silicone), one or more polymeric materials, one or more composite materials, etc. Although shown as including a generally opaque configuration in the particular embodiment illustrated, in certain embodiments, it is envisioned that the cover 114 may include one or more light-permeable materials to allow the light generated (emitted) by the light source(s) 124 to exit the light module through the cover 114 (in addition to the diffuser 108).

The cover 114 is supported by the housing 106 such that the cover 114 is vertically separated (spaced) from a floor 138 (FIG. 3) of the housing 106. Separating the cover 114 from the floor 138 of the housing 106 allows the internal chamber 122 to fill with light generated (emitted) by the light source(s) 124 such that the light is directed (radially) outward through the diffuser 108 to thereby illuminate the installation site (e.g., the cupholder(s) H).

In certain embodiments, it is envisioned that the housing 106 and the cover 114 may include corresponding retention members that are configured for (releasable) engagement so as to inhibit (if not entirely prevent) unintended movement between the housing 106 and the cover 114. For example, it is envisioned that the housing 106 and the cover 114 may include one or more corresponding projections and recesses or the like.

In order to facilitate insertion and removal of the light module 100, in certain embodiments, such as that seen throughout the figures, it is envisioned that the cover 114 may include a tactile member 140 (e.g., a tab 142) (FIG. 2) that is configured for manual engagement by a user. Embodiments devoid of the tactile member 140, however, are also envisioned herein and would not be beyond the scope of the present disclosure.

In certain embodiments, such as that illustrated throughout the figures, the light module 100 may further include one or more adhesive member(s) 144 (FIG. 3). The adhesive member(s) 144 are located within the internal chamber 122 and are configured to secure one or more components of the light module 100 in relation to each other. In the particular embodiments illustrated, for example, the light module 100 includes (first and second) adhesive members 144*i*, 144*ii* that are positioned between the housing 106 and the PCBA 112. More specifically, the adhesive members 144*i*, 144*ii* are located (positioned) within the nodes 118*i*, 118*ii* (FIGS. 2, 3), respectively, and inhibit, if not entirely prevent, relative movement between the housing 106, the inductive member 110, and the PCBA 112. While the adhesive members 144*i*, 144*ii* are shown as discrete components of the light module 100, embodiments are also envisioned in which the adhesive members 144*i*, 144*ii* may be integrally (i.e., unitarily, monolithically) formed from a single piece of material.

Although the light module 100 is shown as including a pair of adhesive members 144 in the particular embodiment illustrated, it should be appreciated that the particular number of adhesive members 144 may be increased or decreased in various embodiments without departing from the scope of the present disclosure (e.g., depending upon the particular configuration of the housing 106, the PCBA 112, etc.). As such, embodiments of the light module 100 including both fewer and greater numbers of adhesive members 144 are envisioned herein, as are embodiments in which the adhesive member(s) 144 may be omitted altogether.

With continued reference to FIGS. 1-3, the transmitter 200 includes a (second) housing 202; a (second) PCBA 204; a (second) inductive member (coil) 206; and a connector 208 (e.g., a coaxial cable, a flexible printed circuit (FPC), etc.). As described in further detail below, the transmitter 200 is configured for wireless communication with the light module 100 via electromagnetic induction, whereby power (and data) is delivered from the transmitter 200 to the light module 100, which eliminates the need for any physical connection between the light module 100 and the transmitter 200.

The housing 202 includes (first, top and second, bottom) upper and lower housing portions 210, 212, respectively, that collectively define a cavity 214, which is configured to receive (accommodate) the PCBA 204 and the inductive member 206. The housing portions 210, 212 may be configured for engagement (connection) in any suitable manner, whether releasable or non-releasable (i.e., fixed). For example, it is envisioned that the housing portions 210, 212 may be connected (secured) via mechanical fasteners (e.g., one or more bolts, screws, rivets, pins, clips, or the like), in an interference (pressure, snap) fit arrangement, via ultrasonic welding, via an adhesive, etc.

The housing portions 210, 212 include respective corresponding notches 216, 218 that collectively define a window 220. The window 220 is configured to receive the connector 208 such that the connector 208 extends from the PCBA 204 externally of the housing 202 so as to allow for connection of the transmitter 200 to the control module 300.

The PCBA 204 is located between the housing portions 210, 212 within the cavity 214 and supports a plurality of electrical components that facilitate operation of the transmitter 200 in the manner described herein including. For example, as seen in FIG. 3, the PCBA 204 supports the inductive member 206 on an upper (top) surface 222 thereof, whereby the inductive member 206 is also located within the cavity 214, such that electrical signals are delivered from the control module 300 to the inductive member 206 via the PCBA 204.

The inductive members 110, 206 (FIG. 3) are configured for electromagnetic communication to wirelessly deliver power and data therebetween. More specifically, in the particular embodiment of the accent lighting system 1000 illustrated, upon receiving an electrical current, the inductive member 206 creates an induced electromagnetic field that generates an electrical current in the inductive member 110, whereby the inductive member 206 wirelessly delivers power and data to the inductive member 206 to power the light module 100 and illuminate the cupholder(s) H. The strength of the induced electromagnetic field, and the current created in the inductive member 110, may be controlled or customized by altering one or more aspects of the inductive members 110, 206, including, for example, the number of turns in the coils thereof, the transverse (horizontal) cross-sectional dimensions (e.g., the diameters) of the inductive members 110, 206, the (vertical) cross-sectional thicknesses of the inductive members 110, 206, the material(s) from which the inductive members 110, 206 are formed, etc.

While the light module 100 and the transmitter 200 are each illustrated as including a single inductive member 110, 206, respectively, embodiments in which the light module 100 and/or the transmitter 200 may each include a plurality of inductive members 110, 206 are also envisioned herein.

The transmitter 200 is located (positioned) externally of the cupholder(s) H and is configured for connection thereto. More specifically, in the particular embodiment of the accent lighting system 1000 illustrated, the transmitter 200 includes an adhesive member 144*iii* that (removably) connects (secures) the transmitter 200 to the cupholder(s) H so as to inhibit, if not entirely prevent, relative movement therebetween in a manner that further contributes to the elimination of any need to create or form any penetrations at the installation site, thus further simplifying installation and further preventing the creation of any pathways for fluid to inner, generally inaccessible areas of the vehicle so as to further inhibit (if not entirely prevent) any fluid leakage from the cupholder(s) H (e.g., in the event of a spill). It should be appreciated, however, that the transmitter 200 may be connected (secured) to the cupholder(s) H in any manner suitable for this intended purpose. For example, in alternate embodiments of the disclosure, it is envisioned that the transmitter 200 may be connected (secured) to the cupholder(s) H via one or more suitable mechanical fasteners (e.g., one or more clips, etc.), in an interference (pressure, snap) fit arrangement, etc.

The control module 300 regulates and controls operation of the accent lighting system 1000 and delivers data and power to the transmitter 200. More specifically, the control module 300 is connected (secured) to and is positioned (located) between the transmitter 200 and a power source in the vehicle (e.g., an accessory service connector, a wiring harness, a battery in the vehicle, etc.). The control module 300 thus provides an electrical interface between the vehicle (i.e., the power source) and the transmitter 200 that facilitates the delivery of power (e.g., alternating current) to the inductive member 206 such that power flows from the power source to the transmitter 200 through the control module 300 to thereby generate current in the inductive members 110, 206 (FIGS. 4, 8) via electromagnetic induction in the manner described above.

The control module 300 (FIG. 1) is configured to transmit a variety of signals to the transmitter 200, which are then (wirelessly) transmitted from the transmitter 200 to the light module 100 via the respective inductive members 206, 110 and the induced electromagnetic field discussed above to vary operation of the light module 100. For example, it is envisioned that the control module 300 may be configured to vary the color of the light emitted from the light source(s) 124, lighting cycles, lighting intervals, etc., by modulating pulse width (or in any other suitable manner). To facilitate such operation, it is envisioned that the control module 300 may include any suitable combination of electrical components such as, for example, one or more software-based, programmable processors 302.

Although shown as being located beneath the console C (FIG. 1) in the particular embodiment illustrated, it should be appreciated that the control module 300 may be positioned in any suitable location in the vehicle (e.g., in the vehicle's dashboard or glove box, beneath a seat in the passenger compartment, etc.). As such, the present disclosure envisions a variety of embodiments in which the specific location of the control module 300 may be varied.

In certain embodiments, it is envisioned that the accent lighting system 1000 may further include a switch that is in communication with (e.g., connected (secured) to) the control module 300 so as to provide a user interface for the accent lighting system 1000, which may be installed in any suitable, accessible location (e.g., in the console C, in the vehicle's dashboard or glove box, etc.). In such embodiments, it is envisioned that the switch may include one or more buttons (e.g., a power button, a mode button, etc.) that support and control operation of the accent lighting system 1000. For example, the switch may be utilized to vary and control the color of the light emitted from the light source(s) 124, lighting cycles, lighting intervals, etc.

Additionally, or alternatively, it is envisioned that the accent lighting system 100 (e.g., the control module 300) may be configured for wireless communication with the vehicle and/or a mobile device (e.g., a cell phone) via an installed application so as to facilitate remote control of the accent lighting system 100.

With continued reference to FIGS. 1-3, methods of installing and using the accent lighting system 1000 will be discussed.

Initially, the control module 300 is located within the vehicle (e.g., beneath the console C (FIG. 1)), and the transmitter 200 is connected (secured) to the control module 300 via the connector 208. Either prior or subsequent to connection of the control module 300 and the transmitter 200, the transmitter 200 is connected (secured) to the cupholder(s) H (e.g., via the adhesive member 144*iii* (FIG. 3)). More specifically, in the particular embodiment illustrated, the transmitter 200 is connected (secured) to a bottom surface B (FIG. 2) of the cupholder(s) H such that, upon insertion of the light module 100 into the cupholder(s) H, the cupholder(s) H are positioned between the transmitter 200 and the light module 100 and, thus, between the respective inductive members 206, 110. As indicated above, use of the adhesive member 144*iii* allows the transmitter 200 to be connected (secured) to the cupholder(s) H without forming any openings or penetrations, which allows the cupholder(s) H (e.g., the bottom surface B thereof) to remains intact, continuous, and devoid of any openings, thereby avoiding the creation of any pathways for fluid (e.g., in the event of a spill).

Following connection of the transmitter 200 to the cupholder(s) H, the light module 100 is inserted into the cupholder(s) H (e.g., via the tactile member 140 (FIG. 2)), during which, it is envisioned that the light module 100 may engage (contact) the inner surface S (FIG. 1) of the cupholder(s) H so as to inhibit (if not entirely prevent) unintended movement of the light module 100 within the cupholder(s) H. As indicated above, the absence of any fixed connection between the light module 100 and the cupholder(s) H eliminates (obviates) any need to create or form any penetrations in the cupholder(s) H and, thus, further avoids the creation of any pathways for fluid.

Upon activation of the accent lighting system 1000, current is delivered from the power source in the vehicle to the transmitter 200 through the control module 300, thereby energizing the inductive member 206 (FIG. 3). As current flows through the inductive member 206, the resultant induced magnetic field creates current in the inductive member 110, which is transmitted to the light source(s) 124 via the PCBA 112. The light generated (emitted) by the light source(s) 124 fills the internal chamber 122 and is collected and distributed by the diffuser 108 to thereby illuminate the light module 100 and the cupholder(s) H.

As discussed above, during use of the accent lighting system 1000, it is envisioned that the color of the light emitted from the light source(s) 124, the lighting cycles, lighting intervals, etc., may be varied (e.g., via the switch, via wireless communication between the vehicle and the control module 300, via the aforementioned mobile device application, etc.) to thereby vary operation of the light module 100 and alter the overall interior appearance of the vehicle.

Figure 4:
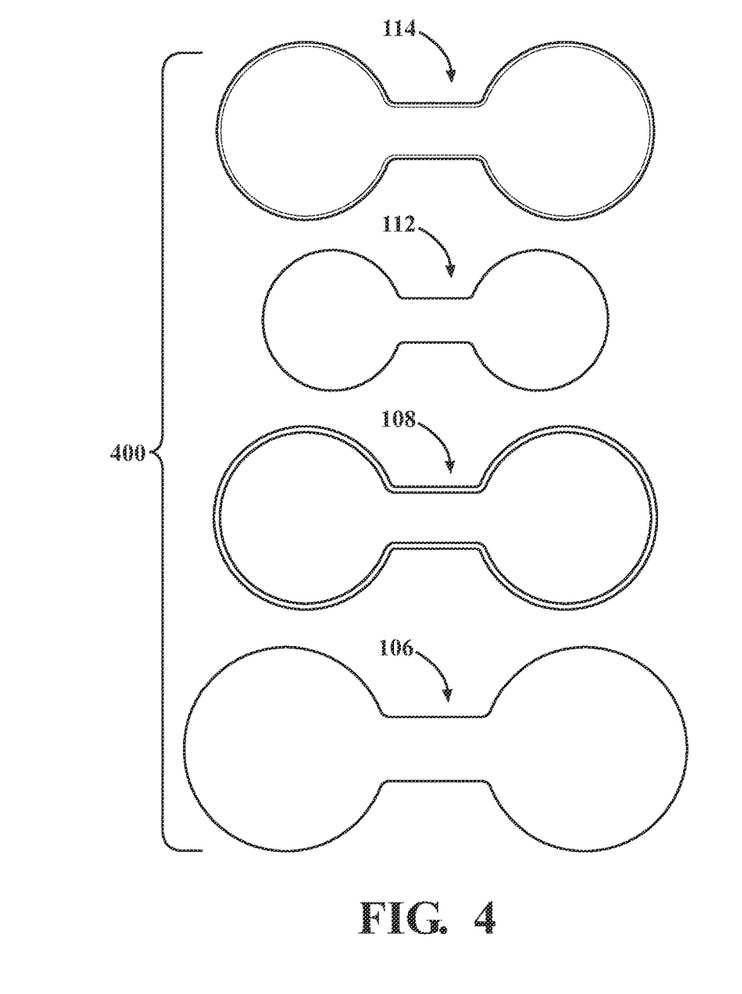
FIG. 4 is a top, plan view of one embodiment of the light module, which is flexible in construction, shown with parts separated.

With reference now to FIG. 4, another embodiment of the light module 100 will be discussed, which is identified by the reference character 400. The light module 400 includes components and features that are similar to the light module 100 (FIGS. 1-3) discussed above and, accordingly, will only be discussed with respect to differences therefrom in the interest of brevity. As such, identical reference characters will be utilized to refer to elements, structures, features, etc., common to the light modules 100, 400.

The light module 400 includes: the housing 106; the diffuser 108; the inductive member 110 (FIG. 3), which is omitted for clarity in FIG. 4; the PCBA 112; and the cover 114. In contrast to the light module 100, in which the diffuser 108 is formed integrally with the housing 106, in the light module 400, the housing 106 and the diffuser 108 are configured as separate, discrete components (i.e., components that are formed from separate pieces of material) that may be connected (secured) together in any suitable manner including, for example, via one or more mechanical fasteners (e.g., one or more bolts, screws, rivets, pins, clips, or the like), via ultrasonic welding, via an adhesive, etc.

The light module 400 is flexible in construction in that each of the housing 106, the diffuser 108, the PCBA 112, and the cover 114 includes (i.e., is formed partially or entirely from) (one or more) at least one flexible material. The flexible construction of the light module 400 facilitates insertion and removal of the light module 400 by allowing for resilient deformation (e.g., bending, deflection) thereof. The flexible construction of the light module 400 also improves conformity between the configuration of the light module 400 and the configuration of the cupholder(s) H (i.e., such that the outer profile 116 (FIG. 1) of the light module 400 more closely approximate (matches, mirrors) the inner profile P of the cupholder(s) H upon insertion), which enhances the overall fit and finish at the installation site (e.g., the console C), and allows for sound dampening (e.g., during the placement of container(s) with the cupholder(s) H). Additionally, in certain embodiments, it is envisioned that the particular flexible material(s) incorporated into the light module 400 may be chosen so as to inhibit (if not entirely prevent) the leakage of any spilled fluids from the cupholder(s) H.

In the illustrated embodiment, the housing 106 and the cover 114 include identical material(s) (e.g., a thermoplastic elastomer, such as TPV), the diffuser 108 includes (i.e., is formed partially or entirely from) silicone, which may be colored in order to vary the overall appearance of the light module 400, and the PCBA 112 includes (i.e., is formed partially or entirely from) one or more FPCs. Embodiments in which the housing 106 and the cover 114 may include different material(s) are also envisioned herein, however, as are embodiments in which one or more alternate materials may be utilized in construction of the housing 106, the diffuser 108, and/or the cover 114 and would not be beyond the scope of the present disclosure.

Figure 5:
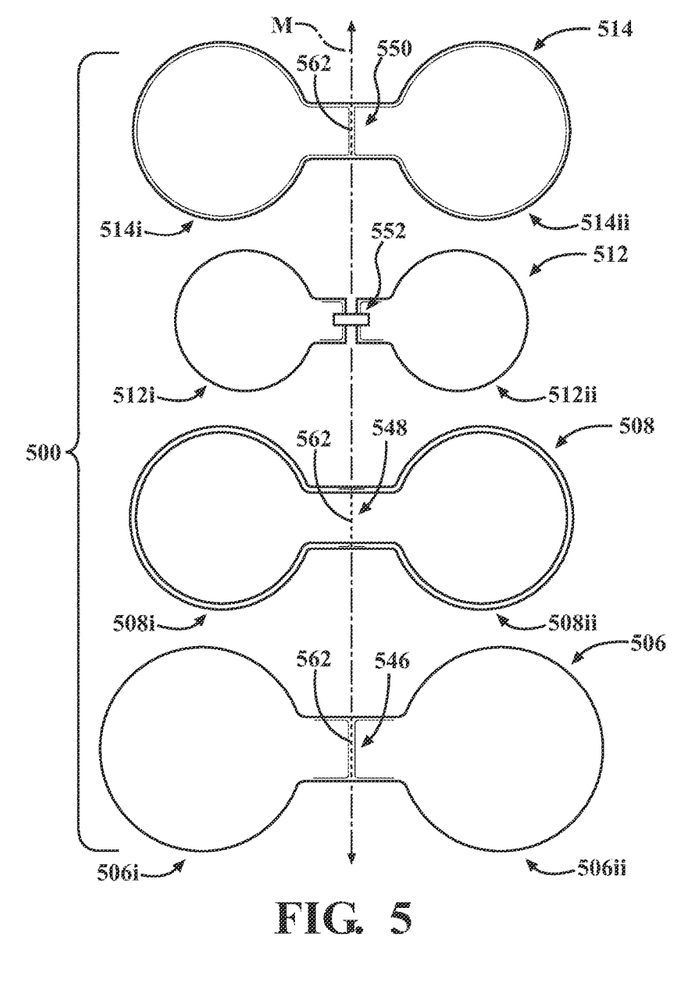
FIG. 5 is a top, plan view of another embodiment of the light module, which is reconfigurable between an unfolded configuration and a folded configuration, shown with parts separated.
Figure 6:
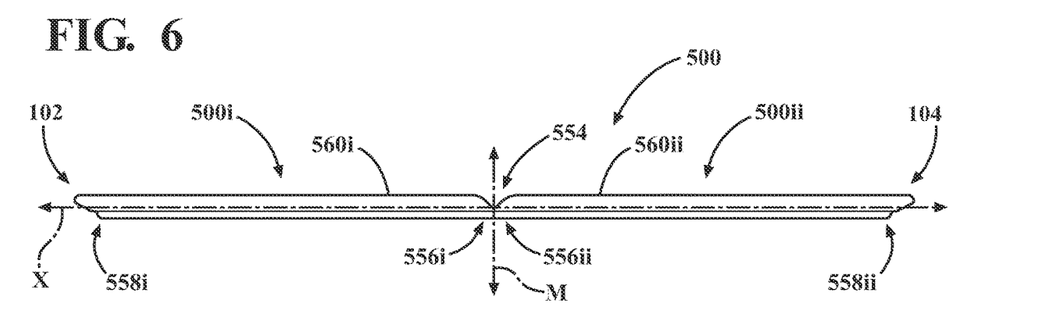
FIG. 6 is a side, plan view of the light module seen in FIG. 5 shown assembled and in the unfolded configuration.
Figure 7:
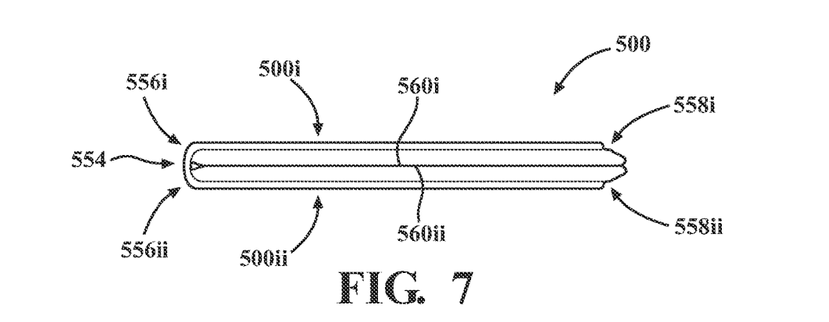
FIG. 7 is a side, plan view of the light module seen in FIG. 5 shown assembled and in the folded configuration.

FIGS. 5-7 illustrate another embodiment of the light module 100, which is identified by the reference character 500. The light module 500 includes components and features that are similar to the light modules 100 (FIGS. 1-3), 400 (FIG. 4) discussed above and, accordingly, will only be discussed with respect to differences therefrom in the interest of brevity. As such, identical reference characters will be utilized to refer to elements, structures, features, etc., common to the light modules 100, 400, 500.

The light module 500 includes: a housing 506; a diffuser 508; the inductive member 110 (FIG. 3), which is omitted for clarity in FIGS. 5-7; a PCBA 512; and a cover 514, as discussed above in connection with the light module 400 (FIG. 4). In contrast to the light module 400, however, which is flexible in construction, the light module 500 is rigid in construction in that the housing 506, the diffuser 508, the PCBA 512, and/or the cover 514 includes (i.e., is formed partially or entirely from) (one or more) at least one rigid material.

In the illustrated embodiment, the housing 506 and the cover 514 include identical material(s) (e.g., polypropylene), the diffuser 508 includes (i.e., is formed partially or entirely from) polycarbonate, which may be colored in order to vary the overall appearance of the light module 500, and the PCBA 512 includes (i.e., is formed partially or entirely from) one or more rigid circuit boards. Embodiments in which the housing 506 and the cover 514 may include different material(s) are also envisioned herein, however, as are embodiments in which one or more alternate materials may be utilized in construction of the housing 506, the diffuser 508, and/or the cover 514, and would not be beyond the scope of the present disclosure. For example, an embodiment in which the PCBA 512 may include the FPCs discussed above in connection with the PCBA 112 included in the light module 400 (FIG. 4), rather than the rigid circuit board(s), is envisioned herein.

As seen in FIG. 5, the housing 506 includes (first and second) housing portions 506*i*, 506*ii* that are (movably, pivotably) connected (secured) at a (first) hinge member 546, the diffuser 508 includes (first and second) diffuser portions 508*i*, 508*ii* that are (movably, pivotably) connected (secured) at a (second) hinge member 548, the PCBA 512 includes (first and second) PCBA portions 512*i*, 512*ii*, and the cover 514 includes (first and second) cover portions 514*i*, 514*ii* that are (movably, pivotably) connected (secured) at a (third) hinge member 550. The PCBA portions 512*i*, 512*ii* are (movably, pivotably) connected (secured) by a (flexible) electrical connector 552 (e.g., a wire, a cable, an FPC, a ribbon cable, etc.) and are connected (secured) to the cover portions 514*i*, 514*ii* by the aforementioned adhesive members 144*i*, 144*ii* (FIG. 3), respectively. The electrical connector 552 extends between and electrically connects the PCBA portions 512*i*, 512*ii* such that data and/or power are communicable therebetween during operation of the light module 500.

Collectively, the housing portion 506*i*, the diffuser portion 508*i*, the PCBA portion 512*i*, and the cover portion 514*i* describe a (first) segment 500*i* of the light module 500, and the housing portion 506*ii*, the diffuser portion 508*ii*, the PCBA portion 512*ii*, and the cover portion 514*ii* describe a (second) segment 500*ii* of the light module 500. More specifically, the segment 500*i* includes an inner (first) end 556*i* and an opposite outer (second) end 558*i*, and the segment 500*ii* includes an inner (first) end 556*ii* and an opposite outer (second) end 558*ii*.

The segments 500*i*, 500*ii* of the light module 500 are (movably, pivotably) connected (secured) at a joint 554, which is collectively defined by the hinge members 546, 548, 550 and the electrical connector 552 and facilitates reconfiguration of the light module 500 between an unfolded configuration (FIG. 6) and a folded configuration (FIG. 7). In the unfolded configuration, the segments 500*i*, 500*ii* are positioned in adjacent relation such that the respective outer ends 558*i*, 558*ii* of the segments 500*i*, 500*ii* are spaced from each other along the central longitudinal axis X. By contrast, in the folded configuration, the segments 500*i*, 500*ii* are superimposed such that outer surfaces 560*i*, 560*ii* thereof are positioned in adjacent (e.g., contacting) relation and the respective outer ends 558*i*, 558*ii* of the segments 500*i*, 500*ii* are generally aligned along the central longitudinal axis X, which reduces the overall dimensions of the light module 500 and facilitates storage thereof when removed from the cupholder(s) H.

In the illustrated embodiment, the hinge members 546, 548, 550 are each configured as a living hinge 562. It should be appreciated, however, that the hinge members 546, 548, 550 may be configured as and may include any structure suitable for the intended purpose of facilitating reconfiguration of the light module 500 between the unfolded configuration and the folded configuration in the manner described herein. For example, it is envisioned that the hinge members 546, 548, 550 may each include a mechanical hinge, corresponding standoffs and receptacles (e.g., detents and recesses) with generally annular (e.g., circular) cross-sectional configurations, etc.

The light module 500 is configured such that the hinge members 546, 548, 550 and the electrical connector 552 are generally aligned along the central longitudinal axis X (i.e., such that the joint 554 extends in generally orthogonal relation thereto). More specifically, the light module 500 is configured such that the hinge members 546, 548, 550 and the electrical connector 552 are generally aligned with a midline M of the light module 500, which extends in generally orthogonal relation to the central longitudinal axis X and is located generally equidistant from the ends 102, 104 thereof, whereby the light module 500 is generally symmetrical about the central longitudinal axis X and the midline M. It should be appreciated, however, that the light module 500 may be configured in any manner suitable for the intended purpose of facilitating reconfiguration of the light module 500 between the unfolded and folded configurations. For example, embodiments in which the hinge members 546, 548, 550 and the electrical connector 552 may be offset from the midline M (i.e., along the central longitudinal axis X) are envisioned herein, as are embodiments in which the joint 554 may extend in generally parallel relation to the central longitudinal axis X (i.e., such that the hinge members 546, 548, 550 and the electrical connector 552 extend in generally parallel relation to the central longitudinal axis X).

Figure 8:
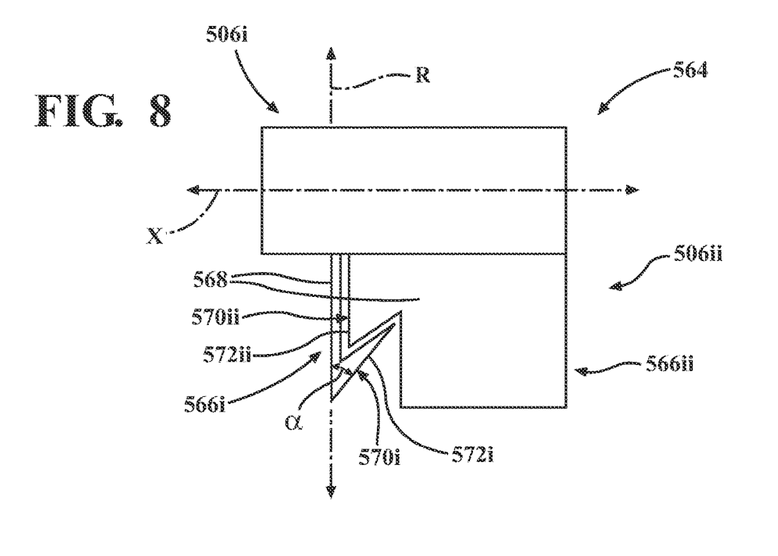
FIG. 8 is a side, plan view of a locking mechanism configured to secure (fix) the light module seen in FIG. 5 in the unfolded configuration.

With reference to FIG. 8, in certain embodiments, it is envisioned that the light module 500 may include a locking mechanism 564 in order to secure (fix) the light module 500 in the unfolded configuration (FIG. 6) and inhibit (if not entirely prevent) unintended reconfiguration of the light module 500 from the unfolded configuration into the folded configuration. In the illustrated embodiment, the housing portions 506i, 506ii include respective corresponding (first and second) locking members 566i, 566ii (e.g., clips 568) having teeth 570i, 570ii that are configured for releasable, mechanical (e.g., interlocking) engagement (connection, contact) when the light module 500 is in the unfolded configuration. It should be appreciated, however, that the locking mechanism 564 may be configured in any manner suitable for the intended purpose of fixing (securing) the light module 500 in the unfolded configuration in the manner described herein. For example, an embodiment in which the locking members 566i, 566ii may include corresponding magnetic members (i.e., such that the locking members 566i, 566ii are configured for magnetic engagement) is also envisioned herein and would not be beyond the scope of the present disclosure.

In order to facilitate engagement of the teeth 570i, 570ii during reconfiguration of the light module 500 from the folded configuration into the unfolded configuration, the teeth 570i, 570ii include respective corresponding bearing surfaces 572i, 572ii that are brought into engagement (contact) during reconfiguration of the light module 500 into the unfolded configuration, which causes resilient deflection of the tooth 570i and/or the tooth 570ii from an initial position into a deflected position to allow for continued movement (i.e., separation) of the housing portions 506i, 506ii. Upon reconfiguration into the unfolded configuration, the tooth 570i and/or the tooth 570ii is automatically returned to the initial position (e.g., via the incorporation of one or more resilient materials), whereby the teeth 570i, 570ii are brought into interlocking engagement in the manner illustrated in FIG. 8.

In the illustrated embodiment, the bearing surface 572i includes a chamfered (angled, tapered, beveled) configuration that extends at an angle α in relation to the bearing surface 572ii and a reference axis R, which extends in generally orthogonal relation to the central longitudinal axis X, and the bearing surface 572ii extends in generally parallel relation to the reference axis R. Embodiments in which each of the bearing surfaces 572i, 572ii may include a chamfered (angled, tapered, beveled) configuration are also envisioned herein, however, and would not be beyond the scope of the present disclosure.

Figure 9:
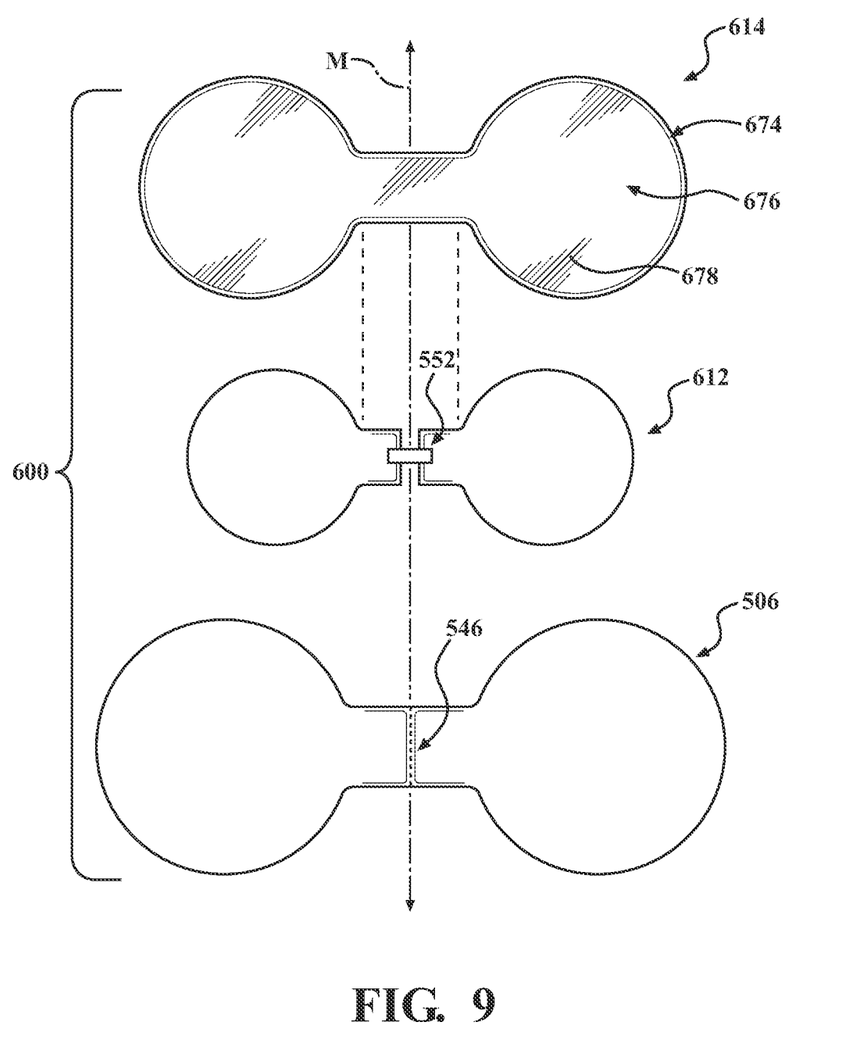
FIG. 9 is a top, plan view of another embodiment of the light module, which includes a display panel, shown with parts separated.

FIG. 9 illustrates another embodiment of the light module 100, which is identified by the reference character 600. The light module 600 includes components and features that are similar to the light module 500 (FIGS. 5-7) discussed above and, accordingly, will only be discussed with respect to differences therefrom in the interest of brevity. As such, identical reference characters will be utilized to refer to elements, structures, features, etc., common to the light modules 500, 600.

In addition to the housing 506, the light module 600 includes a PCBA 612 and a cover 614, which includes a display panel 674.

In contrast to the PCBA 112 (FIGS. 1-4) and the PCBA 512 (FIGS. 5-7), the PCBA 612 is devoid of the light source(s) 124 (FIG. 3). Rather, as described in further detail below, light is generated (emitted) by the display panel 674.

The display panel 674 is integrated into the cover 614 and may be connected (secured) thereto in any suitable manner (e.g., via an adhesive). The display panel 674 is in electrical communication with the PCBA 612 (e.g., via one or more wires or the like), which allows the power that is (wirelessly) communicated from the transmitter 200 (FIGS. 1-3) to the light module 600 (i.e., via the inductive members 110, 206 (FIG. 3)) to be delivered to the display panel 674 via the PCBA 612.

In the illustrated embodiment, the display panel 674 is configured as an (OLED) screen 676, which allows the display panel 674 to display moving patterns, images, videos, etc., in addition to emitting light in a wide range of colors (e.g., greater than that emitted by the light source(s) 124 (FIG. 3)). In order to facilitate reconfiguration of the light module 600 between the unfolded and folded configurations in the manner discussed above, the display panel 674 is flexible in construction. More specifically, in the illustrated embodiment, the screen 676 includes a flexible glass 678, which allows the display panel 674 to include a generally uniform appearance that is devoid of any interrupted surfaces.

In certain embodiments, however, it is envisioned that the display panel 674 may include a seam (e.g., a fold) (not shown) that is generally aligned with the hinge member 546 and the electrical connector 552 (i.e., such that the seam extends in generally orthogonal relation to the central longitudinal axis X (FIGS. 1, 6) of the light module 600). More specifically, in such embodiments, the light module 600 is configured such that the hinge member 546, the electrical connector 552, and the seam are generally aligned with the midline M of the light module 600. As discussed above in connection with the light module 500, however, it should be appreciated that the light module 600 may be configured in any manner suitable for the intended purpose of facilitating reconfiguration between the unfolded and folded configurations.

Persons skilled in the art will understand that the various embodiments of the disclosure described herein and shown in the accompanying figures constitute non-limiting examples, and that additional components and features may be added to any of the embodiments discussed herein above without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper." "lower," "inner," "outer," "left," "right." "upward." "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally." "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 180°±25% (i.e., an angle that lies within the range of (approximately) 135° to (approximately)) 225° and the term "generally orthogonal" should be understood as referring to configurations in with the pertinent components are oriented so as to define an angle therebetween that is equal to 90°±25% (i.e., an angle that lies within the range of (approximately) 67.5° to (approximately)) 112.5°. The term "generally parallel" should thus be understood as referring to encompass configurations in which the pertinent components are arranged in parallel relation, and the term "generally orthogonal" should thus be understood as referring to encompass configurations in which the pertinent components are arranged in orthogonal relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C. or any combination of A. B. and C.

What is claimed is:

1. An accent lighting system for a vehicle, the accent lighting system comprising:
   a light module configured for insertion into a cupholder in a console of the vehicle, wherein the light module includes:
      a housing;
      a diffuser extending along an outer perimeter of the housing and including one or more light-permeable materials so as to allow light to pass therethrough;
      a first inductive member located within the housing; and
      a cover supported by the housing, wherein the housing, the cover, and the diffuser are flexible in construction so as to allow the light module to conform to the cupholder; and
   a transmitter located externally of the cupholder and including a second inductive member configured for electromagnetic communication with the first inductive member such that the second inductive member wirelessly delivers power to the first inductive member, thereby obviating any need for penetrations in the cupholder to establish electrical communication between the transmitter and the light module so as to inhibit fluid leakage from the cupholder.

2. The accent lighting system of claim 1, wherein the housing and the cover each include a thermoplastic elastomer.

3. The accent lighting system of claim 1, further comprising:
   a printed circuit board assembly (PCBA) located within the housing, wherein the PCBA is flexible in construction.

4. The accent lighting system of claim 3, further comprising:
   an adhesive member positioned between the housing and the PCBA.

5. The accent lighting system of claim 3, wherein the PCBA includes at least one light source and is in electrical communication with the first inductive member such that the first inductive member delivers power to the at least one light source.

6. The accent lighting system of claim 5, wherein the at least one light source is connected to the PCBA and is spaced radially inward from the diffuser to inhibit visual perception of the at least one light source.

7. An accent lighting system for a vehicle, the accent lighting system comprising:

a light module configured for insertion into a cupholder in a console of the vehicle, wherein the light module defines a longitudinal axis and includes:
a first segment; and
a second segment connected to the first segment such that the light module is reconfigurable between an unfolded configuration, in which the first segment and the second segment are positioned in adjacent relation along the longitudinal axis, and a folded configuration, in which the first segment and the second segment are superimposed; and
a transmitter located externally of the cupholder and configured for electromagnetic communication with the light module to thereby power the light module.

8. The accent lighting system of claim 7, wherein the light module further includes:
a locking mechanism configured to secure the light module in the unfolded configuration.

9. The accent lighting system of claim 8, wherein the locking mechanism includes first and second locking members configured for mechanical engagement.

10. The accent lighting system of claim 8, wherein the locking mechanism includes first and second locking members configured for magnetic engagement.

11. The accent lighting system of claim 7, wherein the light module further includes:
a housing;
a diffuser extending along an outer perimeter of the housing and configured to distribute light emitted by the light module;
a printed circuit board assembly (PCBA) located within the housing; and
a cover supported by the housing.

12. The accent lighting system of claim 11, wherein the housing, the diffuser, the PCBA, and the cover each include a rigid material.

13. The accent lighting system of claim 11, wherein the housing includes a first hinge member, the diffuser includes a second hinge member, and the cover includes a third hinge member.

14. The accent lighting system of claim 13, wherein the PCBA includes:
first and second PCBA portions; and
an electrical connector electrically connecting the first and second PCBA portions such that data and/or power are communicable therebetween.

15. The accent lighting system of claim 14, wherein the light module is configured such that the first hinge member, the second hinge member, the third hinge member, and the electrical connector are generally aligned along the longitudinal axis.

16. The accent lighting system of claim 15, wherein the light module is configured such that the first hinge member, the second hinge member, the third hinge member, and the electrical connector are generally aligned with a midline of the light module extending in generally orthogonal relation to the longitudinal axis.

17. An accent lighting system for a vehicle, the accent lighting system comprising:
a light module configured for insertion into a cupholder in a console of the vehicle, wherein the light module is reconfigurable between an unfolded configuration and a folded configuration and includes:
a housing;
a printed circuit board assembly (PCBA) located within the housing; and
a cover overlying the PCBA and including a display panel; and
a transmitter located externally of the cupholder and configured for electromagnetic communication with the light module to thereby power the display panel.

18. The accent lighting system of claim 17, wherein the display panel is flexible in construction.

19. The accent lighting system of claim 17, wherein the display panel includes an OLED screen.

20. The accent lighting system of claim 17, wherein the PCBA is in electrical communication with the display panel and supports a first inductive member, wherein the transmitter includes a second inductive member configured for electromagnetic communication with the first inductive member to thereby deliver power to the display panel via the PCBA.

* * * * *